United States Patent [19]
Yoshinaga

[11] Patent Number: 6,111,666
[45] Date of Patent: Aug. 29, 2000

[54] IMAGE READING DEVICE

[75] Inventor: Kenji Yoshinaga, Tokyo, Japan

[73] Assignee: Canon Kabushiki Kaisha, Tokyo, Japan

[21] Appl. No.: 08/629,464

[22] Filed: Apr. 10, 1996

[30] Foreign Application Priority Data

Apr. 12, 1995 [JP] Japan ..................................... 7-086897

[51] Int. Cl.⁷ ..................................................... H04N 1/04
[52] U.S. Cl. ........................... 358/474; 358/475; 358/487
[58] Field of Search .................................... 358/474, 494, 358/497, 471, 475, 487; 359/196, 201, 204, 214, 215, 223; 250/578.1

[56] References Cited

U.S. PATENT DOCUMENTS 5,566,006  10/1996  Yoshinaga et al. ..................... 358/474

*Primary Examiner*—Thomas D. Lee
*Attorney, Agent, or Firm*—Fitzpatrick, Cella, Harper & Scinto

[57] ABSTRACT

There is disclosed an image reading device provided with a photoelectric conversion unit for converting an image on an original into an electric signal, an imaging optical system for focusing the image of the original on the photoelectric conversion unit, and a replacing mechanism for replacing the relative position of the original and the photoelectric conversion unit through the imaging optical system.

27 Claims, 5 Drawing Sheets

IMAGE READING DEVICE

BACKGROUND OF THE INVENTION

1. Field of the Invention

The present invention relates to an image reading device for reading image information as an electrical signal by relative scanning of photoelectric conversion means to an optically focused image.

2. Related Background Art

The image reading device for reading an image, obtained by focusing the light reflected from an original image or transmitted by an original film, with a line sensor such as CCD having a linear array of photosensor elements outputs, in the main scanning direction or the longitudinal direction of the line sensor, detected data corresponding to pixels from the photosensor elements in succession by electrical scanning, and the two-dimensional image information is obtained by mechanical scanning movement between the original image and the line sensor in the transversal or sub-scanning direction.

In order to handle the originals of plural sizes, there are a configuration having plural imaging lenses of different magnifications for matching the respective original sizes with the detecting line length of the line sensor, and switching the imaging lenses according to the original size, and a configuration having only one imaging lens of a magnification for matching the width of the largest-sized original with the detecting line length and, in case of reading a smaller original, projecting the original image with the above-mentioned magnification on a part of the scanning range of the CCD and outputting the data of such part only within the detecting line length.

FIG. 1 is a schematic view of the above-mentioned image reading device having plural lenses of different magnifications and designed for transmissive originals. An original stage 501, composed of a light transmitting flat plate, is horizontally fixed in a stationary position in the main body of the device. It is capable of supporting an original film F of various sizes, for example from a 35 mm film F1 (36×24 mm) to a 4×5 film F2 (4"×5").

Above the original stage 501, there is provided an illuminating unit 502, which is so constructed as to uniformly illuminate the entire reading area of the original film F of the maximum size, for example the 4×5" film F2. In this case it is required to illuminate at least a circular area of a diameter equal to the diagonal length of the 4×5" film F2, so that there is required a large-sized light source 503 with a long illuminating optical path length L0.

A first imaging lens 505 can be positioned below the original stage 501, when a relatively small original such as the 35 mm film F1 is placed thereon, and focuses the light transmitted by the original F in the above-mentioned position onto the light-receiving face of a line sensor 508 positioned therebelow. The first imaging lens 505 has such an imaging magnification that the width for example of the 35 mm film F1 is matched to the detecting line length of the line sensor 508.

On the other hand, a second imaging lens 506 can be positioned below the original stage 501, when a relatively large original such as the 4×5" film F2 is placed thereon, and focuses the light transmitted by the original F in the above-mentioned position onto the light-receiving face of the line sensor 508 therebelow. The second imaging lens 506 has such an imaging magnification that the width of for example the 4×5" film F2 is matched to the detection line length of the line sensor 508.

The above-mentioned first and second imaging lenses 505, 506 are so supported as to be mutually switchable below the original stage 501 and are selected according to size of the original F, whereby the original film F of either size can be projected onto the light-receiving face of the line sensor below. The imaging lenses are switched manually by the operator according to his recognition of the size of the original film F.

The line sensor 508 is rendered capable of a scanning motion, in a plane parallel to the original stage 501, by linear movement mechanism which is not shown, and can read the image of the original film F of various sizes by the scanning of the projected image.

However, such image reading device which switches the plural imaging lenses according to the original size has been expensive because an imaging lens has to be provided for each original size. Also for maintaining the quality of the read image, in exchanging the plural imaging lenses for the originals of different sizes, an extremely high precision is required for the distance between the original and the photoelectric conversion means in each imaging lens and the perpendicularity of the optical axis thereof to the plane of the original. For this reason, the imaging system requires a positioning mechanism supported by a highly rigid structure and finished with an extremely high precision, and is therefore inevitably bulky and complex.

Also in the image reading device having only one imaging lens whose magnification is so selected as to match the width of the largest original with the detecting line length of the line sensor, in case of reading a smaller original, the detecting line length of the line sensor cannot be effectively utilized as the image of the original is projected only on a partial area of the detecting line, so that the resolution of the original cannot be made high.

SUMMARY OF THE INVENTION

An object of the present invention is to provide an image reading device easy for use.

Another object of the present invention is to provide an image reading device capable of high-quality image reading.

Still another object of the present invention is to provide an image reading device capable of highly precise image reading of plural originals without increase in the size of the device.

The foregoing objects can be attained, according to an embodiment of the present invention, by an image reading device comprising photoelectric conversion means for converting an image on the original into an electrical signal, an imaging optical system for focusing the image of the original on the photoelectric conversion means, and replacement means for replacing the relative positions of the original and the photoelectric conversion means through the imaging optical system. Thus there can be obtained an image reading device easy for use, in which the relative positions of the original and the photoelectric conversion means through the imaging optical system can be relocated when required.

Also according to another embodiment of the present invention, there is provided an image reading device comprising first movement means for moving the position of a first original; second movement means for moving the position of a second original; photoelectric conversion means for converting an image on the first or second original into an electrical signal; a third movement means for moving the position of the photoelectric conversion means; an imaging optical system for focusing the image of the first or second original on the photoelectric conversion means; and control means adapted, when the first original moved by the first movement means is in a first position relative to the imaging optical system, to cause the third movement means to move the photoelectric conversion means to a second position conjugate with the first position, and, when the second original moved by the second movement means is in the second position, to cause the third movement means to move the photoelectric conversion means to the first position.

According to still another embodiment of the present invention, there is provided an image reading device comprising first movement means for moving the position of a first original; second movement means for moving the position of a second original in a direction parallel to the moving direction of the first movement means; photoelectric conversion means for converting an image on the first or second original into an electrical signal; and third movement means for moving the position of the photoelectric conversion means in a direction perpendicular to the moving direction of the first or second movement means.

Such configuration enables highly precise image reading of plural originals without increasing the dimension of the device.

Still other objects of the present invention, and the features thereof, will become fully apparent from the following description which is to be taken in conjunction with the attached drawings.

DESCRIPTION OF THE PREFERRED EMBODIMENTS

In the following, the present invention will be clarified by embodiments thereof shown in the attached drawings.

Figure 1:
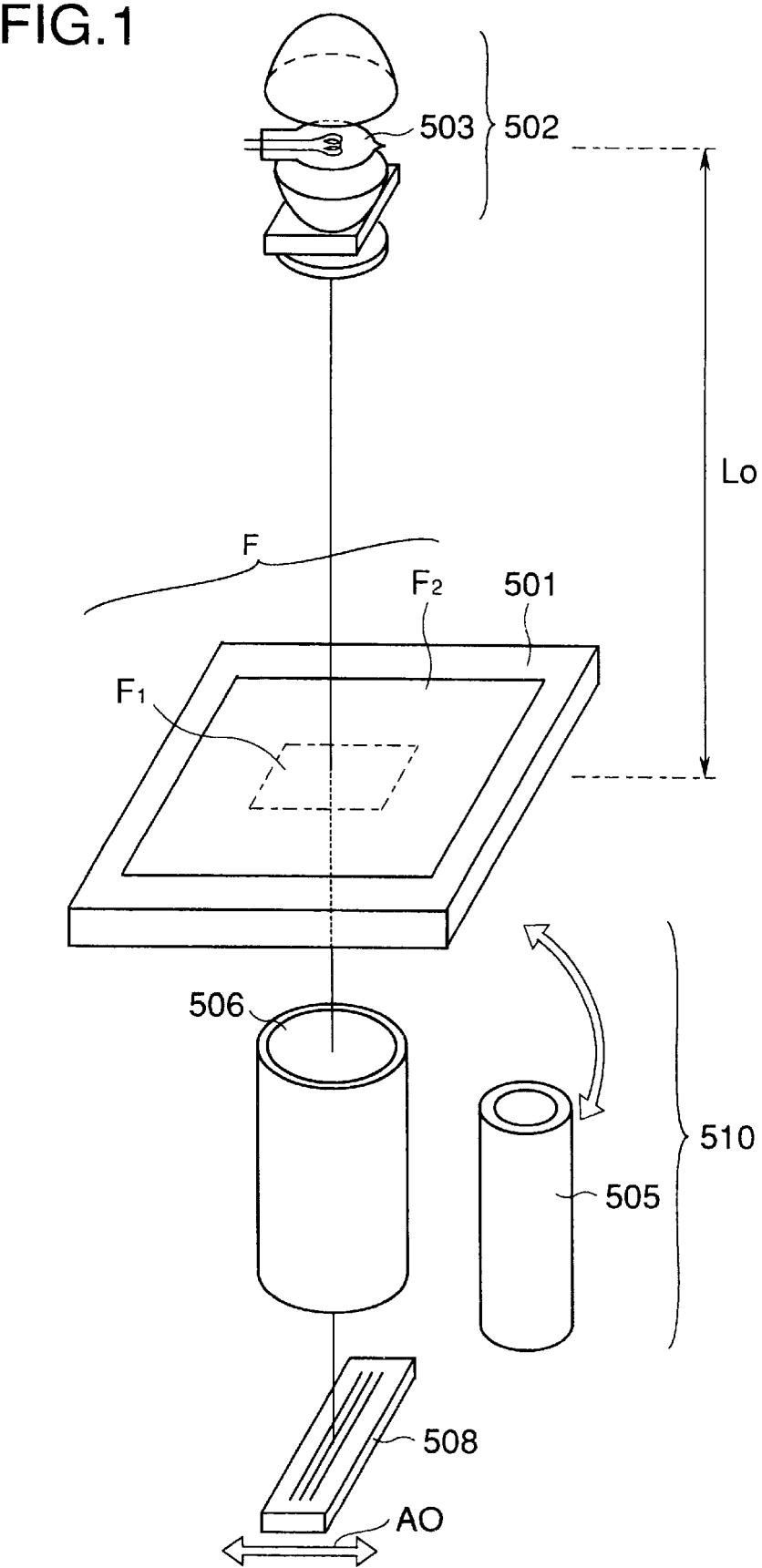
FIG. 1 is a view showing the configuration of a conventional image reading device.
Figure 2:
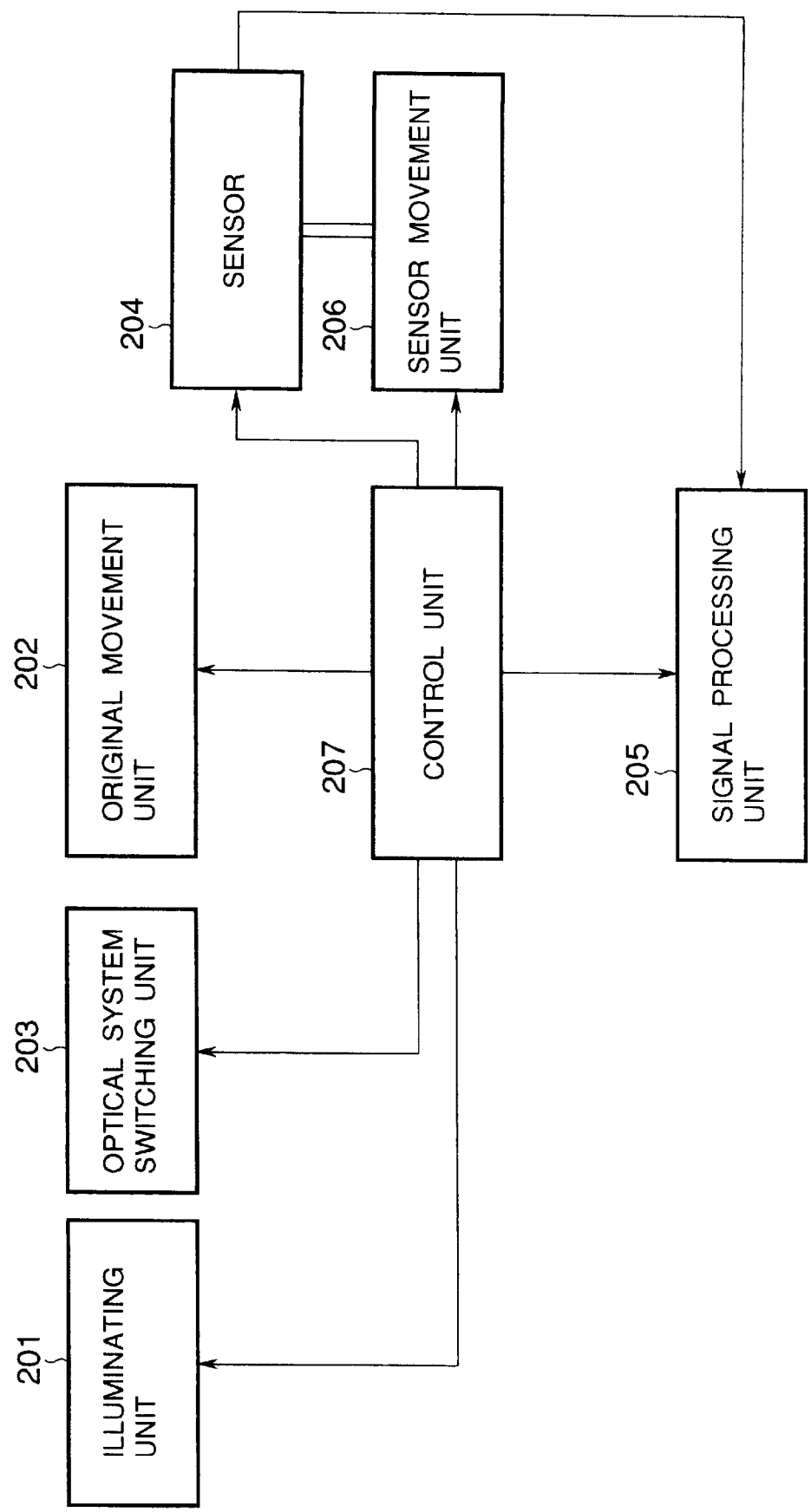
FIG. 2 is a block diagram of an image reading device embodying the present invention.

FIG. 2 is a block diagram of an image reading device embodying the present invention, wherein the light emitted from an illumination unit 201 is switched in its irradiating direction by an optical system switching unit 203 according to the position of an original moving unit 202. The light coming from the irradiated original is read by a sensor 204, and predetermined signal processing is conducted by a signal processing unit 205. The position of the sensor 204 is also movable by a sensor moving unit 206. A control unit 207, constituting control means, controls the entire device. The configuration explained above is common to first to third embodiments to be explained in the following.

Figure 3:
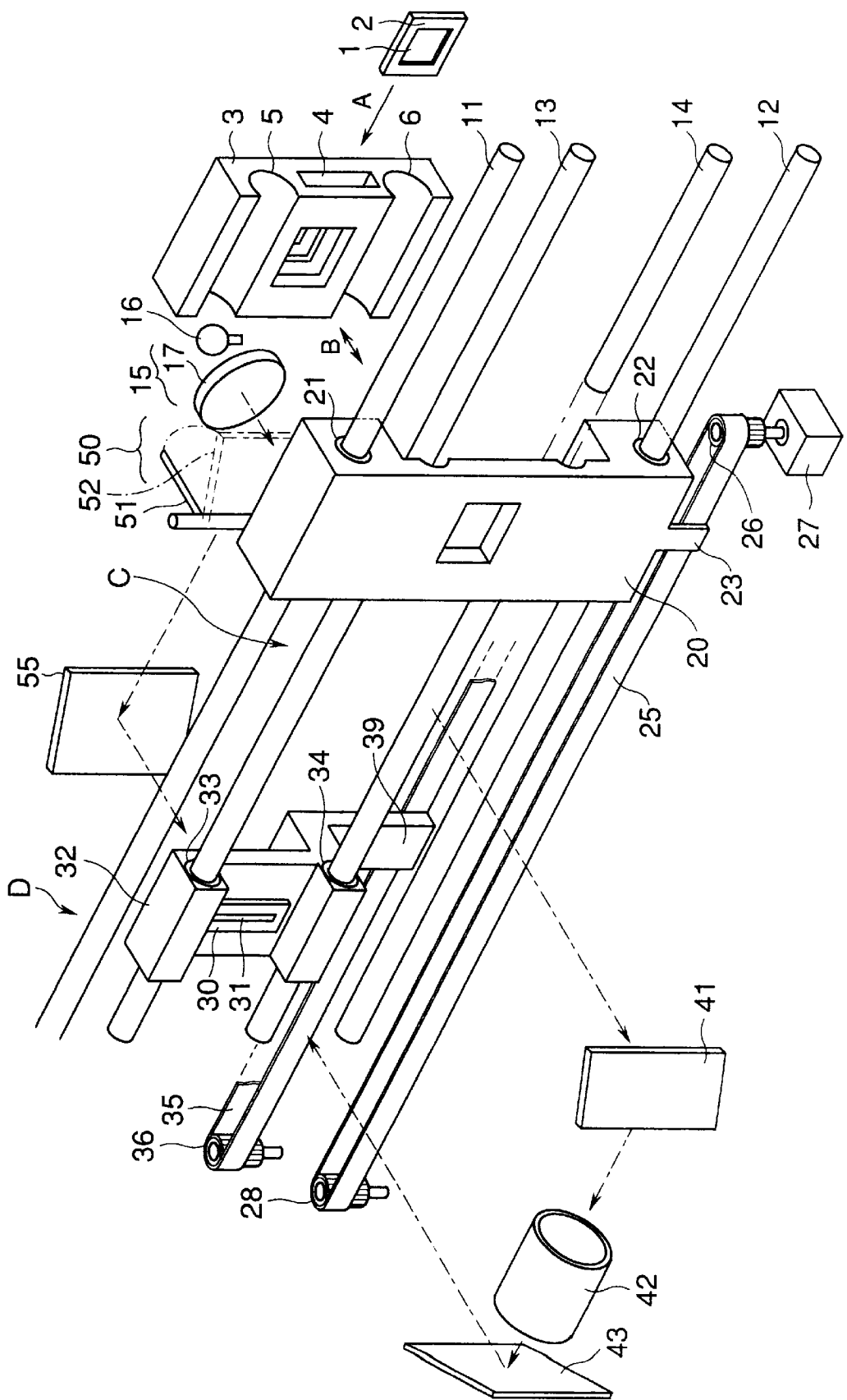
FIG. 3 is a view showing the configuration of the image reading device of a first embodiment.

FIG. 3 is a view showing the configuration of the image reading device constituting a first embodiment of the present invention.

A first rail 11, a second rail 12, a third rail 13 and a fourth rail 14, consisting of circular-sectioned steel rods, are fixed at the ends thereof to an unrepresented frame of the main body of the device, in such a manner that the axes thereof are mutually parallel and are contained in a same plane.

An original film 1, supported in a mount 2, is inserted in a direction A, into an original slot 4 of an original holder 3.

The original holder 3, for holding the original in a planar state, has such a structure that the illuminating light, entering a central image area of the original film 1 from an illuminating unit 15 to be explained later, is transmitted by the original film 1 and emitted to the other side. The original holder 3 is rendered detachable, as indicated by an arrow B, from a side of an original carriage 20 to be explained later. In the upper and lower parts of the original holder 3 there are provided recesses 5, 6 extending in the axial directions of the rails, in such a manner that the original holder 3 does not interfere with the third and fourth rails 13, 14 when it is mounted on the original carriage 20. The original holder 3 is prepared for each size of the original film, with the original film insertion slot and the light transmitting aperture sized accordingly.

The original carriage 20 is constructed so as not to intercept the light entering the image area of the original film 1 and that emitted therefrom. In the upper and lower parts of the original carriage 20, there are provided bearings 21, 22 into which the first and second rails 11, 12 are respectively inserted, whereby the original carriage 20 can move therealong. The plane of the original film 1 is maintained parallel to a plane passing the axes of the first and second rails 11, 12.

Below the second rail 12 and along the axial direction of the rails 11, 12, there is provided a first scanning drive belt 25 which is driven at an end by a motor pulley 26 rotated by a first scanning motor 27 and supported at the other end by a first idler pulley 28.

The first scanning drive belt 25 has, between the pulleys 26, 28, a coupling unit 23 for coupling the belt 25 with the original carriage 20, whereby, as the coupling unit 23 moves in the axial direction of the rails 11, 12 by the rotation of the first scanning motor 27, the original carriage 20 performs a scanning motion while being maintained in position by the rails 11, 12.

The rotation of the first scanning motor 27 is controlled in the forward and reverse directions by the control unit. The first scanning motor 27, the first scanning drive belt 25 and the pulleys 26, 28 constitute first movement means.

Between the first and second rails 11, 12, there are positioned the third and fourth rails 13, 14 of which axes define a plane parallel to the plane containing the axes of the first and second rails 11, 12.

The third and fourth rails 13, 14 support, by means of bearings 33, 34, a sensor support member 32 which is thus movable along the third and fourth rails 13, 14.

The sensor support member 32 supports a CCD line sensor 30, constituting the photoelectric conversion means, in such a manner that a light detecting line portion 31 thereof is positioned on a plane containing the original film in the original carriage 20.

Below the fourth rail 14 and along the axial direction of the rails 13, 14 as in the belt driving system for the original carriage 20, there is provided a second scanning drive belt 35 which is driven at an end by a second motor pulley rotated by an unrepresented second scanning motor and is supported at the other end by a second idler pulley 36. The second scanning drive belt 35, the pulleys and the second scanning motor constitute second movement means. The first and second movement means mentioned above serve also as relocation means for relocating the positions of the original and the CCD line sensor.

The second scanning drive belt 35 has, between the pulleys 36, 37, a coupling unit 39 for coupling the belt 35 with the sensor support member 32, whereby, as the coupling unit 39 moves in the axial direction of the rails 13, 14 by the rotation of the second scanning motor 38, the sensor support member 32 performs a scanning motion while being maintained in position by the rails 13, 14.

The rotation of the second scanning motor is also controlled, like the motor 27, in the forward and reverse directions by the control unit.

The CCD line sensor 30, constituting the photoelectric conversion means of the present embodiment, has 5,000 pixels with a pitch of 10 μm and a total length of 50 mm, and is driven by an unrepresented CCD driver, releasing the output signal to an external equipment through the control unit and an interface.

In the above-explained configuration, when the original holder 3 is not mounted on the original carriage 20, the carriage 20 and the sensor support member 32 do not mutually interfere and are so controlled as to be respectively positioned in either and the other of a first scanning range C facing a first mirror 41 and a second scanning range D facing a second mirror 43.

The first and second mirrors 41, 43 are so positioned as to deflect the optical axis of an imaging lens 42, to be explained later, perpendicularly to the plane of the original film 1 or of the light detecting portion 31 of the CCD line sensor 30.

The imaging lens 42 is so positioned in a fixed position on the main body of the device that the optical axis thereof vertically corresponds to the fixed center of the original film 1, and is adapted to receive the light transmitted by the original from one side and to focus an image on the opposite exit side. In the present embodiment, this lens has a magnification ratio of 2:1, and is therefore adapted, if the original film 1 is in the first scanning range C, to focus an image, reduced to ½ from the original image, on the sensor in the second scanning range D, and, if the original film 1 is in the second scanning range D, to focus an image, enlarged to 2 times from the original image, on the sensor in the first scanning range C.

The illuminating unit 15, composed of a lamp 16 and an illuminating lens 17, is positioned opposite to the imaging lens 42 with respect to the moving plane of the original film 1, and is capable of illuminating the original film 1 in the first scanning range C or in the second scanning range D.

An illumination switching mirror 50, constituting the switching means, is switchable between a first switch position 51 for directing the light from the illuminating unit 15 toward the first mirror 41 in order to scan the original in the first scanning range C and a second switch position 52 for directing the light from the illuminating unit 15 toward a third mirror 55 in order to scan the original in the second scanning range D. The first mirror 41, the imaging lens 42, the second mirror 43, the illumination switching mirror 50 and the third mirror 55 constitute an imaging optical system.

In the following there will be explained the original reading operation in the image reading device of the above-explained configuration.

At first there will be explained the case of reading a large-sized (4"×5") original film. The original carriage 20 is set in the first scanning range C, while the sensor support member 32 is set in the second scanning range D. The switching mirror 50 is in the first switch position 51 to guide the illuminating light from the illuminating unit 15 to the original film 1 in the first scanning range C, and the transmitted light is guided by the first mirror 41, the imaging lens 42 and the second mirror 43 and is focused on the light detecting face 31 of the CCD with a magnification of ½. In this state, the image reading range on the original film 1 is 50×2=100 mm, based on the detection length of the CCD line sensor 30 and the magnification of the imaging lens 42, and is therefore capable of sufficiently covering the shorter side of the effective image area on the 4"×5" film, with a resolution of 10×2=20 μm thereon. Thus the entire image can be read by a relative scanning movement of the CCD line sensor 30 and the original carriage 20.

In the following there will be explained a case of reading a small-sized (35 mm) original. The original carriage 20 is set in the second scanning range D, while the sensor support member 32 is set in the first scanning range C. The switching mirror 50 is in the second switch position 52 to guide the illuminating light from the illuminating unit 15 to the original film 1 in the second scanning range D, and the transmitted light is guided by the second mirror 43, the imaging lens 42 and the first mirror 41 and is focused on the light detecting face 31 of the CCD with a magnification of 2 times. In this state, the image reading range on the original film 1 is 50×½=25 mm, sufficiently covering the shorter side of the effective image area on the 35 mm film, with a resolution of 10×½=5 μm. Thus the entire image can be read by a relative scanning movement of the CCD line sensor 30 and the original carriage 20.

The above-explained configuration allows to maintain the positional accuracy of the optical components, as the movement or replacement of the imaging lens 42 at the switching of the size of the original film as in the conventional device is no longer necessary, and also to improve the resolution in reading a small-sized film in comparison with the case of reading a large-sized film. The sizes of the films are not limited to 4"×5" and 35 mm mentioned above.

As explained in the foregoing, the present embodiment allows, even for plural original sizes, to minimize the number of the imaging lenses and to achieve the image reading without using plural original carriages. Also it can improve the resolution on the small-sized original by effectively utilizing the detection range of the photoelectric conversion means. Also in comparison with the conventional image reading device which switches plural lenses according to the original sizes, the device of the present embodiment can dispense with the particular positioning mechanism for the lens, and is capable of maintaining a high precision in the image position in simple and inexpensive manner. Furthermore the compactization of the device is also made possible.

Figure 4:
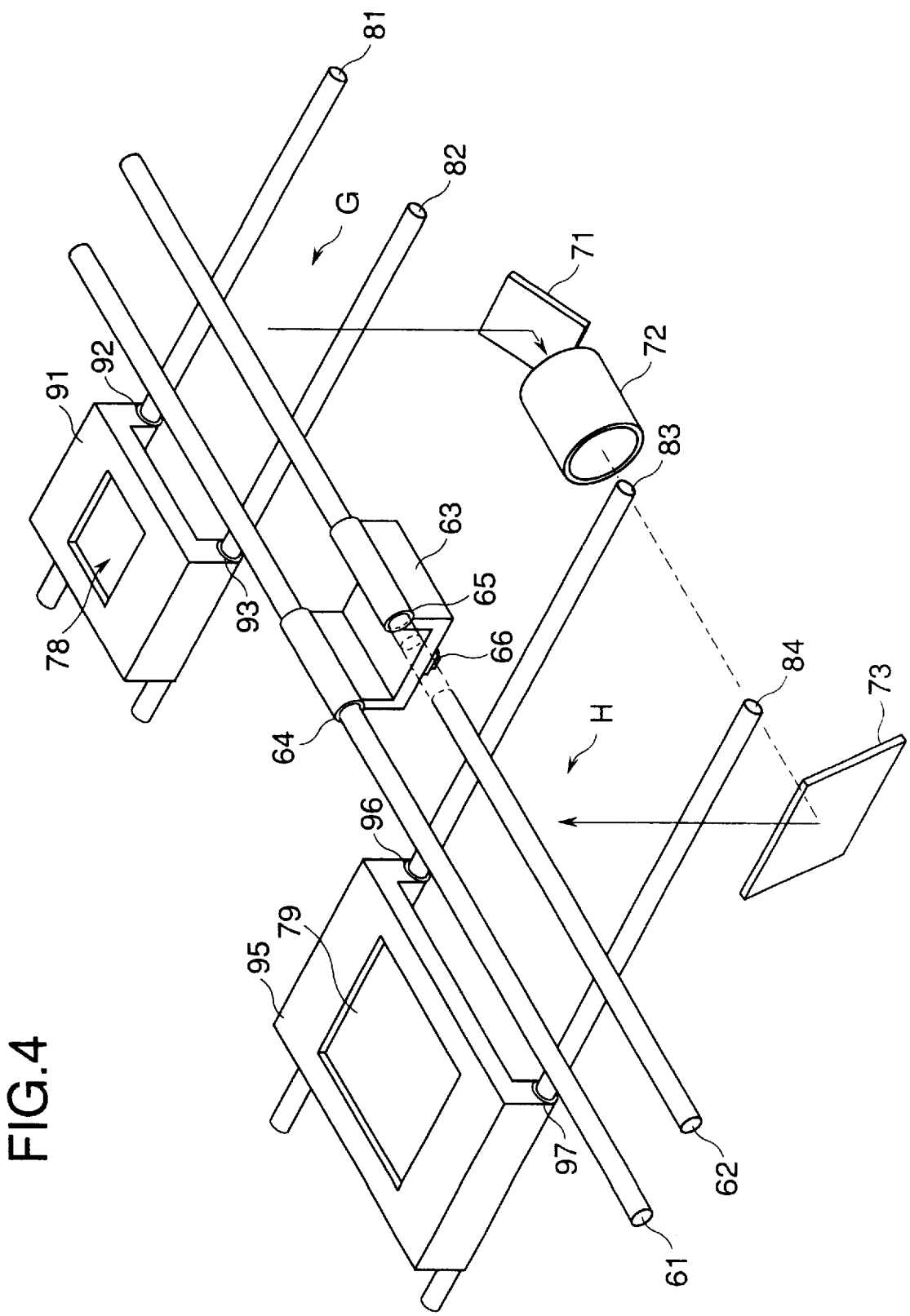
FIG. 4 is a view showing the configuration of the image reading device of a second embodiment.

FIG. 4 shows the configuration of an image reading device, constituting a second embodiment of the present invention, having plural original support units whose moving direction is different from that of a photoelectric conversion unit.

A first sensor rail 61 and a second sensor rail 62, composed of circular-sectioned steel rods, are fixed at the ends thereof to a main body of the device, and are positioned mutually parallel so that the axes thereof are contained in a plane.

A sensor support member 63 is supported by the first and second sensor rails 61, 62 through bearings 64, 65, and is rendered movable in the axial direction of the rails by third movement means, which is omitted in the drawing as it is similar to the movement means in the foregoing first embodiment, composed of the second scanning motor, the second scanning drive belt 35 and the pulleys.

A CCD line sensor 66, constituting the photoelectric conversion means, is supported by a sensor support member 63 in such a manner that the direction of the line of the sensor is parallel to the axial direction of the first and second sensor rails 61, 62 and the light detecting face is lower than the height of the rails 61, 62. Therefore, when the sensor support member 63 moves along the first and second sensor rails 61, 62, the CCD line sensor 66 moves in a plane parallel to the first and second sensor rails 61, 62.

A first mirror 71 and a second mirror 73 are so positioned as to deflect the optical axis of an imaging lens 72, to be explained later, perpendicularly to a plane which contains original films 78, 79 to be explained later or the light detecting face of the CCD line sensor 66. The first and second mirrors 71, 73 and the imaging lens 72 constitute an imaging optical system.

The above-mentioned sensor support member 63 can be stopped at a first detecting position G facing the first mirror 71 and a second detecting position H facing the second mirror 73.

In the rear side in FIG. 4, a first original rail 81 and a second original rail 82 are so provided that they are positioned under and perpendicularly to the first and second sensor rails 61, 62 and that a plane containing the axes of the first and second original rails 81, 82 is parallel to the moving plane of the CCD line sensor 66.

Also in the front side in FIG. 4, a third original rail 83 and a fourth original rail 84 are so provided that they are positioned under and perpendicularly to the first and second sensor rails 61, 62 and that a plane containing the axes of the third and fourth original rails 83, 84 is parallel to the moving plane of the CCD line sensor 66.

A small original carriage 91, for supporting a small-sized first original, is supported, through bearings 92, 93, by the first and second original rails 81, 82 and can be moved therealong by first movement means, which is not illustrated because it is constructed similarly to that in the first embodiment, consisting of the first scanning motor 27, the first scanning drive belt 25 and the pulleys 26, 28. In this configuration, the face of the original supported by the small original carriage 91 is so set as to be in the moving plane of the CCD line sensor 66.

A large original carriage 95, supporting a large-sized second original, is supported, through bearings 96, 97, by the third and fourth original rails 83, 84 can be moved therealong by second movement means, which is again omitted from the illustration as it is constructed, like the first movement means, similarly to that in the first embodiment, consisting of the first scanning motor 27, the first scanning drive belt 25 and the pulleys 26, 28.

In this configuration, the face of the original supported by the large original carriage 95 is so set as to be in the moving plane of the CCD line sensor 66.

The imaging lens 72 has its optical axis below the first and second sensor rails 61, 62 and on a vertical plane passing the line of the CCD line sensor 66, and is adapted to receive the light transmitted by the original at a side and to focuses an image at the other side. Also in this embodiment, the imaging lens has an imaging magnification ratio of 2:1 as in the first embodiment, so that, in reading the original film 79 in the large original carriage 95, it forms an image, reduced to ½, of the original on the light detecting face of the sensor in the first detecting position G, and, in reading the original film 78 in the small original carriage 91, it forms an image, enlarged to 2 times, of the original on the light detecting face of the sensor in the second detecting position H.

Illumination means is provided in the first detecting position G of the sensor support member 63, and is rendered capable of illuminating the original film in the small original carriage 91 or that in the large original carriage 95, by switching the illuminating direction. Such illumination means is omitted from the illustration as it is similar to the illuminating unit 15 in the first embodiment. It may also be positioned above the second detecting position H.

An illumination switching mirror which is not shown is so provided, as in the first embodiment, as to be switchable between a first switch position for directing the illuminating light toward the large original carriage 95 and a second switch position for directing the illuminating light toward the small original carriage 91.

In the following there will be explained the original reading operation in the image reading device of the above-explained configuration.

In case of reading a large-sized (4"×5") original film, the film 79 is mounted in the large original carriage 95, and the sensor support member 63 is moved to and stopped at the first detecting position G. The small original carriage 91 retreats to a position not interfering with the sensor support member 63. The switching mirror is in the first switch position where the illuminating light can illuminate the original film 79 in the large original carriage 95, and the transmitted light is guided by the second mirror 73, the imaging lens 72 and the first mirror 71 and is focused, with a magnification of ½, on the light detecting face at the first detecting position G. In this state, the image reading range on the original film 79 is 50×2=100 mm, thus sufficiently covering the shorter side of the effective image area of the 4"×5" film, with a resolution of 10×2=20 μm on the original film 79. Thus the entire image can be read by a scanning movement of the large original carriage 95.

In case of reading a small-sized (35 mm) original film, the original film 78 is mounted in the small original carriage 91, and the sensor support member 63 is moved to and stopped at the second detecting position H. The large original carriage 95 retreats to a position not interfering with the sensor support member 63. The switching mirror is in the second switch position where the illuminating light can illuminate the original film 78 in the small original carriage 91, and the transmitted light is guided by the first mirror 71, the imaging lens 72 and the second mirror 73 and is focused, with a magnification of 2 times, on the light detecting face of the CCD in the second detecting position H. In this state, the image reading range on the original film 78 is 50×½=25 mm, thus sufficiently covering the shorter side of the effective image area of 35 mm film, with a resolution of 10 μm×½=5 μm. consequently, the resolution can be made higher than in the case of reading the large-sized original film, and the entire image can be read by a scanning movement of the small original carriage 91. The size of the film is not limited to 4"×5" or 35 mm mentioned above.

As explained in the foregoing, the present embodiment allows to minimize the number of imaging lenses even in case of handling plural original sizes and to improve the resolution on the small-sized original by effectively utilizing the detection area of the photoelectric conversion means. Also it enables to provide an image reading device which is less expensive and can maintain a high precision in the image position with a simpler structure, without a particular positioning mechanism for the lens, in comparison with the conventional image reading device which switches plural lenses according to the original size. Also the compactization of the device is made possible.

Figure 5:
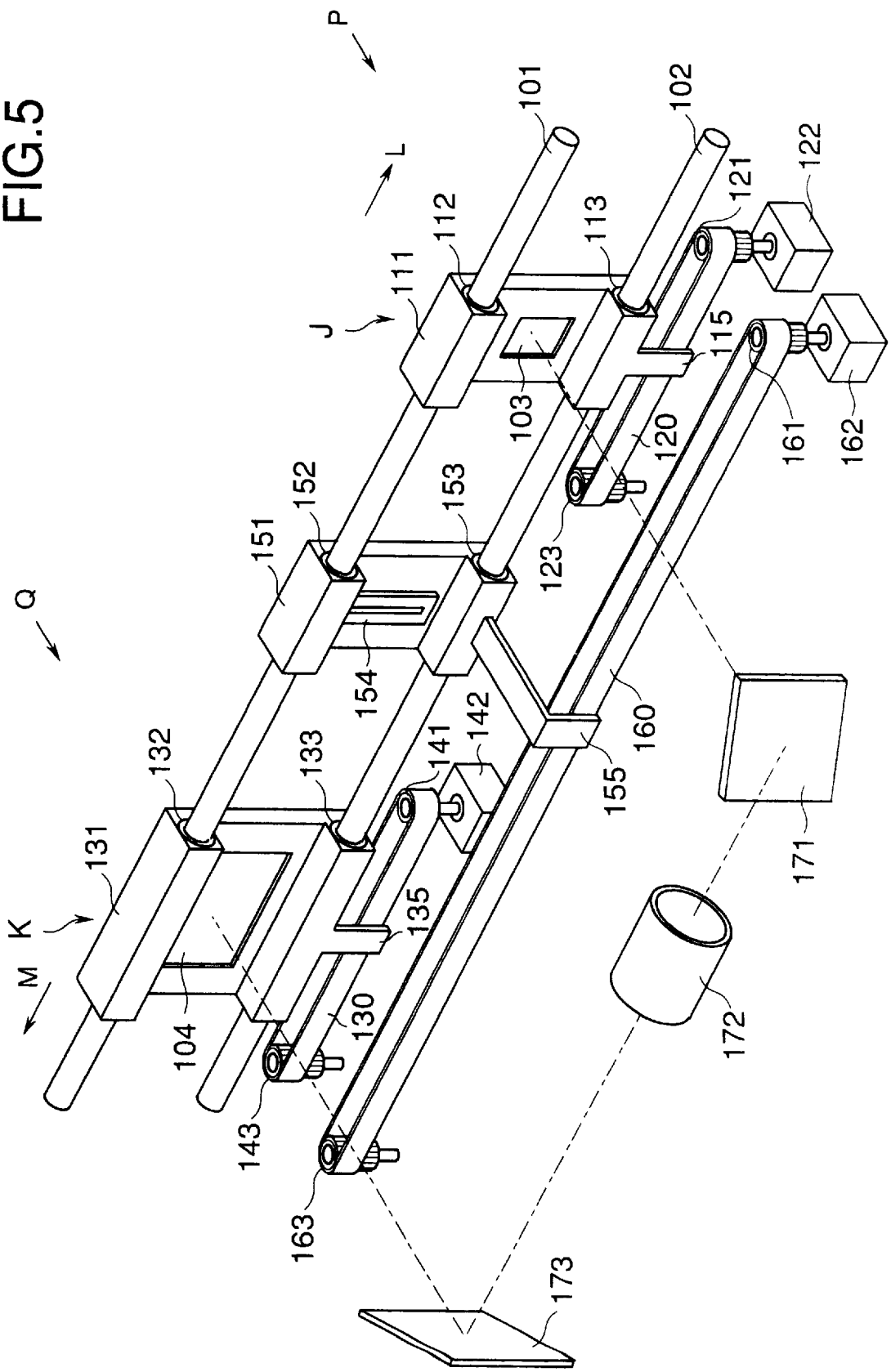
FIG. 5 is a view showing the configuration of the image reading device of a third embodiment.

FIG. 5 shows the configuration of an image reading device constituting a third embodiment of the present invention in which the guide members have a same configuration for the original support unit and the photoelectric conversion unit, and which is provided with plural original support units.

An upper rail 101 and a lower rail 102, composed of circular-sectioned steel rods, are fixed at the ends thereof to a frame of the device, and is so positioned that the axes thereof are contained in a plane.

A small original carriage 111 is supported, through bearings 112, 113, by the upper rail 101 and the lower rail 102 and is rendered movable in the axial direction of the rails 101, 102. The small original carriage 111 has such a structure as to support a first (small-sized) original film 103 and to transmit the illuminating light. The small original carriage 111 is provided thereunder with a belt coupling unit 115, for coupling with a drive belt 120 to be explained later.

Below the small original carriage 111 there is provided, along the axial direction of the rails 101, 102, a drive belt 120 which is driven at an end by a motor pulley 121 rotated by a first scanning motor 122 and supported at the other end by a first idler pulley 123. The drive belt 120, the scanning motor 122 and the pulleys 121, 123 constitute first movement means.

Between the pulleys 121, 123 the drive belt 120 has a coupling unit 115 for coupling with the small original carriage 111, whereby, as the coupling unit 115 moves in the axial direction of the rails 101, 102 by the rotation of the first scanning motor 122, the small original carriage 111 performs a scanning movement while being supported in position by the rails 101, 102.

A large original carriage 131 is supported, through bearings 132, 133, by the upper rail 101 and the lower rail 102, and is rendered movable in the axial direction of the rails 101, 102. The large original carriage 131 has such a structure as to support a second (large-sized) original 104 and to transmit the illuminating light. The large original carriage 131 is provided thereunder with a belt coupling unit 135 for coupling with a drive belt 130 to be explained later.

Below the large original carriage 131 there is provided, along the axial direction of the rails 101, 102, a drive belt 130 which is driven at an end by a motor pulley 141 rotated by a second scanning motor 142 and supported at the other end by a second idler pulley 143. The drive belt 130, the scanning motor 142 and the pulleys 141, 143 constitute second movement means.

Between the pulleys 141, 143, the drive belt 130 has a coupling unit 135 for coupling with the large original carriage 131, whereby, as the coupling unit 135 moves in the axial direction of the rails 101, 102 by the rotation of the second scanning motor 142, the large original carriage 131 performs a scanning movement while being supported in position by the rails 101, 102.

The configuration is so made that the plane of the small-sized original film 103 supported by the small original carriage 111 and that of the large-sized original 104 supported by the large original carriage 131 belong to a same plane.

Between the small original carriage 111 and the large original carriage 131, there is provided a sensor support member 151, which is supported, like the original carriages 111, 131, by the upper rail 101 and the lower rail 102 through thrust bearings 152, 153 and is rendered movable in the axial direction of the rails 101, 102. The sensor support member 151 supports a CCD line sensor 154, constituting photoelectric conversion means, in such a manner that the light detecting face thereof lies in the plane containing the plane of the small-sized original film 103 supported by the small original carriage 111 and that of the large-sized original film 104 supported by the large original carriage 131.

The CCD line sensor 154 of the present embodiment has 5,000 pixels, with a total length of 50 mm and with a pixel size of 10 $\mu$m, and is driven by CCD driver which is not shown. Its output signal is supplied to an external equipment through a control unit and an interface.

Below the sensor support member 151 there is provided, along the axial direction of the rails 101, 102, a drive belt 160 which is driven at an end thereof by a motor pulley 161 rotated by a third scanning motor 162 and is supported at the other end by a third idler pulley 163. The drive belt 160 so extends as to cover the scanning movement range of the small original carriage 111 and that of the large original carriage 131. The drive belt 160, the scanning motor 161 and the pulleys 161, 163 constitute third movement means.

Between the pulleys 161 and 163, the drive belt 160 has a coupling unit 155 for coupling with the sensor support member 151, whereby, as the coupling 155 is moved in the axial direction of the rails 101, 102 by the rotation of the third scanning motor 162, the sensor support member 151 can move from the scanning movement range of the small original carriage 111 to that of the large original carriage 131, while being supported in position by the rails 101, 102.

A first mirror 171 and a second mirror 173 are so positioned as to deflect the optical axis of an imaging lens, to be explained later, perpendicularly to the plane of the original films or that of the light detecting unit of the CCD line sensor 154. The first and second mirrors 171, 173 and the imaging lens 172 constitute an imaging optical system.

The imaging lens 172 is provided in a fixed position in the device in such a manner that the optical axis vertically corresponds to the center of the original films and of the CCD line sensor 154, and is adapted to receive, at a side thereof, the light transmitted by the original and to focus an image on the other side. Also in this embodiment, as in the first and second embodiments, it has an imaging magnification ratio of 2:1, so that, when the small original film 103 is in the first scanning range J opposed to the first mirror 171, the imaging lens forms an image of the original, magnified to 2 times, on the light detecting face of the sensor in the second scanning range K opposed to the second mirror 173, and, when the large-sized original film 104 is in the second scanning range K, it forms an image of the original, reduced to ½, on the light detecting face of the sensor in the first scanning range J.

The illuminating means for illuminating the originals is not illustrated as it is similar to the illuminating unit 50 in the first embodiment. It is so constructed, by the switching of the illuminating direction, as to illuminate the first scanning range J in a direction P when the small-sized original film 105 is therein, or to illuminate the second scanning range K in a direction Q when the large-sized original film 104 is therein.

In the following there will be explained the original reading operation in the image reading device of the above-explained configuration.

In case of reading the large-sized (4"×5") original film, the first scanning motor 122 is activated to retract the small original carriage 111 in a direction L, and the third scanning motor 162 is activated to set the sensor support member 151 in the first scanning range J. Also the large original carriage 131, supporting the large-sized original film 104, is set in the first scanning range K. The light transmitted by the large-sized original film 104 is guided by the second mirror 173, the imaging lens 172 and the first mirror 171 and is focused, with a magnification of ½, on the CCD line sensor 154 in the first scanning range J. In this state, the reading range on the large-sized original film is 50×2=100 mm, sufficiently covering the shorter side of the effective image area of the 4"×5" film, with a resolution of 10 μm×2=20 μm. In this state the entire image can be read by a relative scanning movement of the CCD image sensor 151 and the large original carriage 131.

In case of reading the small-sized (35 mm) original film, the second scanning motor 142 is activated to retract the large original carriage 131 in a direction M, and the third scanning motor 162 is activated to set the sensor support member 151 in the second scanning range K. Also the small original carriage 111, supporting the small-sized original film 103, is set in the first scanning range J. The light transmitted by the small-sized original film 103 is guided by the first mirror 171, the imaging lens 172 and the second mirror 173 and is focused, with a magnification of 2 times, on the CCD line sensor 154 in the second scanning range K. In this state, the reading range on the original film is 50×½=25 mm, sufficiently covering the shorter side of the effective image area of the 35 mm film, with a resolution of 10 μm×½=5 μm thereon. In this state the entire image can be read by a relative scanning movement of the CCD line sensor 154 and the small original carriage 111, and the resolution can be made higher than in the case of reading the large-sized original film.

The foregoing embodiment realizes two imaging magnifications with a single imaging lens, but it is also possible to increase the number of the imaging magnifications, by employing plural imaging lenses and plural groups of mirrors in such a manner that the scanning range corresponding to each lens lies in the plane of the originals or the scanning plane of the photoelectric conversion unit, thereby allowing to select suitable imaging magnifications for the originals of various sizes. Also the size of the film is not limited to 4"×5" or 35 mm mentioned above.

Still more, the scanning plane of the photoelectric conversion unit need not necessarily be same as that containing the originals, as long as a conjugate imaging relationship stands therebetween with a constant optical path length.

As explained in the foregoing, the present embodiment allows to minimize the number of the imaging lenses even for plural original sizes and to improve the resolution on the original face of the small-sized original by effective utilization of the detecting area of the photoelectric conversion means. Also there can be provided an inexpensive image reading device which can maintain a highly precise imaging position with a simpler configuration and without a particular lens positioning mechanism, in comparison with the conventional image reading device in which plural lenses are switched according to the original size. Furthermore, a reduction in the cost is made possible by the decrease in the number of component parts, as the same rails are used for supporting the two original carriages and the sensor.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading device comprising:
    a) photoelectric conversion means for converting an image on an original into an electrical signal;
    b) an imaging optical system for focusing the image on said photoelectric conversion means; and
    c) change means for changing a position of said photoelectric conversion means with a position of the original to change magnification of image formation of the image to be focused onto said photoelectric conversion means, while not changing a position of said imaging optical system.

2. An image reading device according two claim 1, wherein the position of the original and the position of said photoelectric conversion means, changed by said change means, are mutually conjugate.

3. An image reading device according to claim 2, wherein said change means includes first movement means for moving the position of the original and second movement means for moving the position of said photoelectric conversion means in a direction parallel but opposite to the direction of movement by said first movement means.

4. An image reading device according to claim 3, further comprising illumination means for illuminating the original, and switching means for switching the direction of irradiation of said illumination means according to the change of the relative position of the original and said photoelectric conversion means by said change means.

5. An image reading device according to claim 2, further comprising illumination means for illuminating the original, and switching means for switching the direction of irradiation of said illumination means according to the change of the relative position of the original and said photoelectric conversion means by said change means.

6. An image reading device according to claim 1, wherein said change means includes first movement means for moving the position of the original and second movement means for moving the position of said photoelectric conversion means in a direction parallel but opposite to the direction of movement by said first movement means.

7. An image reading device according to claim 6, further comprising illumination means for illuminating the original, and switching means for switching the direction of irradiation of said illumination means according to the change of the relative position of the original and said photoelectric conversion means by said change means.

8. An image reading device according to claim 1, further comprising illumination means for illuminating the original, and switching means for switching the direction of irradiation of said illumination means according to the change of the relative position of the original and said photoelectric conversions means by said change means.

9. An image reading device according to claim 1, wherein said change means is adapted to change the relative position of the original and said photoelectric conversion means according to a size of the original.

10. An image reading device comprising:
    a) first movement means for moving a position of first holding means for holding a first original;
    b) second movement means for moving a position of second holding means for holding a second original;
    c) photoelectric conversion means for converting an image on the first or second original into an electrical signal;
    d) third movement means for moving a position of said photoelectric conversion means;
    e) an imaging optical system for focusing the image of the first or second original on said photoelectric conversion means; and
    f) control means for, when the first holding means is moved by said first movement means to a first position relative to said imaging optical system, controlling said second movement means to retreat the second holding means and said third movement means to move said photoelectric conversion means to a second position conjugate with the first position, and for, when the second holding means is moved by said second movement means to the second position, controlling said first movement means to retreat the first holding means and said third movement means to move said photoelectric conversion means to the first position.

11. An image reading device according to claim 10, wherein said first to third movement means are adapted to effect mutually parallel movements.

12. An image reading device according to claim 11, further comprising illumination means for illuminating said originals, wherein said control means is adapted to switch the direction of irradiation of said illumination means according to the position of said photoelectric conversion means.

13. An image reading device according to claim 12, further comprising illumination means for illuminating said originals, wherein said control means is adapted to switch the direction of irradiation of said illumination means according to the position of said photoelectric conversion means.

14. An image reading device according to claim 10, further comprising illumination means for illuminating said originals, wherein said control means is adapted to switch the direction of irradiation of said illumination means according to the position of said photoelectric conversion means.

15. An image reading device according to claim 10, wherein the first and second originals are mutually different in size.

16. An image reading device comprising:

a) first movement means for moving a position of first holding means for holding a first original;

b) second movement means for moving a position of second holding means for holding a second original in a direction parallel to the direction of movement by said first movement means;

c) photoelectric conversion means for converting an image on the first or second original into an electrical signal;

d) third movement means for moving a position of said photoelectric conversion means in a direction perpendicular to the direction of movement by said first or second movement means; and e) control means for, when the first holding means is moved by said first movement means to a first position relative to an imaging optical system, controlling said second movement means to retreat the second holding means and said third movement means to move said photoelectric conversion means to a second position conjugate with the first position, and for, when the second holding means is moved by said second movement means to the second position, controlling said first movement means to retreat the first holding means and said third movement means to move said photoelectric conversion means to the first position.

17. An image reading device according to claim 16, wherein said first and second movement means are adapted to effect movements in mutually opposite directions.

18. An image reading device according to claim 17, further comprising illumination means for illuminating said originals, wherein said control means is adapted to switch the direction of irradiation of said illumination means according to the position of said photoelectric conversion means.

19. An image reading device according to claim 16, wherein said first and second movement means are adapted to effect movements in mutually opposite directions.

20. An image reading device according to claim 19, further comprising illumination means for illuminating said originals, wherein said control means is adapted to switch the direction of irradiation of said illumination means according to the position of said photoelectric conversion means.

21. An image reading device according to claim 16, further comprising illumination means for illuminating said originals, wherein said control means is adapted to switch the direction of irradiation of said illumination means according to the position of said photoelectric conversion means.

22. An image reading device according to claim 16, wherein the first and second originals are mutually different in size.

23. A photoelectric conversion unit for converting an image on an original into an electric signal comprising:

first movement means for changing a position of an object;

second movement means for changing a position of said photoelectric conversion unit;

mode switching means for switching between a first mode and a second mode; and control means for controlling said first and second movement means such that in the first mode, the object is located at a first position and said photoelectric conversion unit is located at a second position, and in the second mode, the object is located in the second position and said photoelectric conversion unit is located at the first position.

24. A unit according to claim 23, wherein the position of the object and the position of said photoelectric conversion unit, changed respectively by said first and second movement means, are mutually conjugate.

25. A unit according to claim 23, further comprising illumination means for illuminating the original, and switching means for switching the direction of irradiation of said illumination means according to a change of the relative position of the object and said photoelectric conversion unit by said first and second movement means.

26. A unit according to claim 23, wherein said mode switching means switches the mode according to a kind of the original.

27. A unit according to claim 23, wherein said mode switching means switches the mode according to a size of the original.

* * * * *

UNITED STATES PATENT AND TRADEMARK OFFICE
CERTIFICATE OF CORRECTION

PATENT NO. : 6,111,666
DATED : August 29, 2000
INVENTOR(S) : Kenji Yoshinaga

It is certified that error appears in the above-identified patent and that said Letters Patent is hereby corrected as shown below:

Column 1,
Line 21, "are" should read -- is --.

Column 7,
Lines 19 and 25, "so provided" should read -- provided so --.

Column 8,
Line 6, "so" should be deleted;
Line 7, "as" (second occurrence) should read -- so as --; and
Line 47, "consequently," should read -- Consequently, --.

Column 9,
Line 6, "is" should read -- are --; and
Line 52, "so made" should read -- made so --.

Column 10,
Line 12, "so" should be deleted; and
Line 13, "as" should read -- so as --.

Column 12,
Line 7, "two" should read -- to --.

Signed and Sealed this

Twentieth Day of November, 2001

*Attest:*

*Nicholas P. Godici*

*Attesting Officer*

NICHOLAS P. GODICI
*Acting Director of the United States Patent and Trademark Office*